(12) United States Patent
Dubost

(10) Patent No.: US 8,689,644 B2
(45) Date of Patent: Apr. 8, 2014

(54) DEVICE FOR DETECTING SHOCKS ON A STRUCTURE

(75) Inventor: Jerome Dubost, La Salvetat Saint Gilles (FR)

(73) Assignee: Airbus Operations S.A.S., Toulouse (FR)

( * ) Notice: Subject to any disclaimer, the term of this patent is extended or adjusted under 35 U.S.C. 154(b) by 86 days.

(21) Appl. No.: 13/421,178

(22) Filed: Mar. 15, 2012

(65) Prior Publication Data

US 2012/0234110 A1  Sep. 20, 2012

(30) Foreign Application Priority Data

Mar. 17, 2011 (FR) .................................... 11 52217

(51) Int. Cl.
| | |
|---|---|
| *G01L 1/00* | (2006.01) |
| *G01L 3/02* | (2006.01) |
| *G01L 5/04* | (2006.01) |
| *G01B 11/16* | (2006.01) |
| *G01N 19/06* | (2006.01) |
| *G01N 3/00* | (2006.01) |
| *G01N 3/20* | (2006.01) |
| *H01H 29/02* | (2006.01) |

(52) U.S. Cl.
USPC ............ 73/862.381; 73/862.193; 73/862.391; 73/762; 73/783; 73/788; 73/849; 200/203

(58) Field of Classification Search
USPC ............ 73/862.193, 862.391, 762, 783, 788, 73/849; 200/203
See application file for complete search history.

(56) References Cited

U.S. PATENT DOCUMENTS

| | | | | |
|---|---|---|---|---|
| 5,454,322 A | * | 10/1995 | Sakamoto et al. | ............ 102/247 |
| 5,520,055 A | | 5/1996 | Fuessinger | |
| 5,843,558 A | * | 12/1998 | Yoshizaki et al. | ............ 428/112 |
| 7,032,457 B1 | | 4/2006 | Dorfman | |
| 8,251,399 B2 | * | 8/2012 | Babian | ......................... 280/752 |
| 2011/0220006 A1 | | 9/2011 | Kaye et al. | |

FOREIGN PATENT DOCUMENTS

| | | |
|---|---|---|
| EP | 2 176 123 B1 | 4/2010 |
| WO | WO 2009/019511 A1 | 2/2009 |

OTHER PUBLICATIONS

French Preliminary Search Report and Written Opinion issued Dec. 12, 2011, in French 1152217, filed Mar. 17, 2011 (with English Translation of Categories of Cited Documents).

* cited by examiner

*Primary Examiner* — Nitin Patel
*Assistant Examiner* — Sheikh Maruf
(74) *Attorney, Agent, or Firm* — Oblon, Spivak, McClelland, Maier & Neustadt, L.L.P.

(57) ABSTRACT

A detection device for shocks on a part comprises a base intended to be fixed by a lower face onto a surface of the part where the occurrence of a shock is to be detected and comprises one or more detectors fixed at the base and protruding with respect to the base, a detector being deformed in a persistent way with a magnitude equal to or greater than a threshold magnitude when it is subjected to a shock with an energy equal to or greater than a threshold energy. Under the effect of such a shock with energy or greater, a detector is simply deformed or broken such that the visual inspection allows the occurrence of the shock to be detected.

15 Claims, 2 Drawing Sheets

DEVICE FOR DETECTING SHOCKS ON A STRUCTURE

TECHNICAL FIELD

This invention belongs to the field of the inspection of structures.

More specifically, the invention relates a device making it possible to detect during a visual inspection the occurrence of a shock on a structure and even more specifically a device making it possible to evaluate during this visual inspection the energies involved in the shock.

BACKGROUND OF THE INVENTION

In structures where the integrity of some parts must be guaranteed in service, for example in aircraft structural parts, the sensitive parts, at least for their critical and vulnerable portions, should not be subjected to shocks that may damage them and which would have the effect of decreasing their mechanical characteristics in the more or less long term.

In particular, certain portions of parts, which will be not visible and protected when the structure is in service, appear vulnerable during manufacture, for example due to a possibility of a dropped tool or a person accidentally stepping on a vulnerable area.

This problem must be taken into account in the case of composite materials comprising a stacking of plies adhering to each other via a resin, where a shock can lead to plies becoming separated inside the material, a local delamination, which is not visible from the outside and requires the implementation of means to verify the internal structure of the material in order to be detected and characterized.

A first known method for guaranteeing the integrity of the parts consists of protecting the parts, temporarily or permanently, by devices able to absorb the energy, within certain limits, during an impact. Many devices, most often adapted to specific situations, therefore use materials made from elastomer forming mattresses or protective panels made from wood or metal, which temporarily or permanently cover the area and the elements to be protected.

In certain situations the mass or dimensions of such protective devices make them difficult to use.

Another known method consists of preparing the parts so as to ensure that when a shock occurs the event will be detected subsequently during an inspection.

Thus certain methods utilize parts mounted in the areas at risk, designed to be damaged by absorbing the energy of a shock in order to protect the structure and fixed on the structure so that they can be replaced if necessary. Such parts, known as sacrificial because they are designed to be sacrificed so as to protect another part, present the defect that they must be adapted to each model of the part to be protected, which in practice limits use to cases in which a specific risk has been identified.

It is known, for example, to protect the tops of stiffeners of structural panels by placing elements enveloping the stiffener at their summits, as described in patent application FR2932707. In the event of a shock the enveloping element is damaged protecting the stiffener and can be replaced. In this case, when it is necessary to remove the damaged element precautions must be taken so that the protected structure is not then damaged.

Other methods have the sole purpose of detecting when a shock has actually occurred on a part, showing the location of the impact. For this purpose it is proposed, for example in patent GB 2 194 062, to use paints incorporating microcapsules of a coloring product, not visible in the encapsulated state, but which becomes observable in the visible range when the dye is released as a result of a shock having locally broken the microcapsules, giving a good indication of the extent of the impacted area.

An inconvenience of this method is the fact that it is difficult in this case to assess the energy of the impact, and therefore how great the risk of damage is; for that it is, in practice, necessary to carry out a detailed inspection of the impacted area, an area for which, in addition, the paint does not provide any mechanical protection against shocks.

Moreover, such paints are costly, more sensitive to abrasion that standard paints and, if the precaution of repainting an impacted area with a paint of this type is not taken, shocks will no longer be detected.

BRIEF SUMMARY OF THE INVENTION

The present device of the invention for detecting the occurrence of shocks on a structure provides a solution that combines the advantages of various known devices and methods for detecting shocks with no unacceptable inconvenience when the device is utilized.

The device of the invention makes it possible to subsequently visualize, without special means, that a shock has actually occurred and at the same time precisely locate the location and extent of the shock, making it possible to assess the energy involved in the shock and, to a certain extent, identify the type or at least the size of the object that caused the shock on the part.

The device for detecting shocks on a part according to the invention is an inert structure arranged so that a shock causes a persistent and visually observable change of state to portions of the detection device.

The detection device comprises:
  a base intended to be fixed by a lower face onto a surface of the part where the occurrence of a shock is to be detected and
  at least one detector fixed at the base on an opposite upper face of the base, the at least one detector consisting of an element of the structure of the detection device, protruding with respect to the upper face of the base, the mechanical resistance of the at least one detector, defined by its geometric dimensions and the material it is made from, being determined so that the at least one detector undergoes a persistent deformation of a magnitude equal to or greater than a selected threshold magnitude As when the at least one detector is subjected to the shock of an object with an energy equal to or greater than a selected threshold energy Es.

Thus, by choosing a threshold magnitude As large enough to be visually observable without any special instrument, a shock becomes detectable by visually inspecting the detection devices once its energy has reached or exceeded the value of the threshold energy Es, even if the part does not show any damage in a visual examination, and if the shock had a lower energy, it will not be detected because of the low magnitude deformations, below the threshold magnitude As, that it would generate.

In one form of embodiment, a detector is made from a ductile material able to be fully or partially plastically deformed under the effect of a shock with an energy greater than a predefined value. 'Ductile material' means a material able to be plastically deformed without breaking. In this form, the observable deformation corresponds to the plastic deformation of the detector, no portion of which detaches from the base.

Advantageously the threshold magnitude is chosen between 1 and 5 mm so as to be observable by visual inspection.

In another form of embodiment, a detector is made from a fragile material, able to be fully or partially deformed to breaking under the effect of a shock with an energy greater than a predefined value. 'Fragile material' means a material that breaks in the elastic field. In this form of embodiment, the observable deformation corresponds to observing that the detector has been broken.

In one form of embodiment, a detector is formed mainly by a web substantially perpendicular to the upper face of the base on which it is fixed, with a height hd and a thickness ed that are small relative to a length parallel to the upper face of the base. This form of embodiment is especially suited to the manufacture of detection device by extruding the material forming the detector through a die with a suitable cross-section.

In another form of embodiment a detector has a pin shape, protruding at a height hd with respect to the upper face of the base, making it possible in particular to reduce the mass of the detection device.

The detection device potentially also has the following characteristics, singly or in any technically possible combinations:
- the base comprises recesses apart from areas for fixing detectors to the base;
- a detector is made from a metallic material;
- a detector is made from a polymer material;
- the lower face of the base comprises an adhesive for fixing onto a surface of a part;
- the detection device comprises a plurality of detectors distributed over the base, the distances d between detectors determining a minimum characteristic dimension of an impacting object that is to be detected;
- the base is made from a ductile material able to be deformed so as to take the shape of a so-called sensitive surface of a part on which the detection device is intended to be fixed;
- faces of detectors and/or the upper face of the base are tinted to increase the visual contrast between the detectors and the base or between different faces of a detector;
- the base is made from a material and with a thickness eb determined so that the detection device provides mechanical protection for the part on which it is intended to be fixed with regard to shocks with an energy less than the threshold energy Es of shocks that is to be detected.

The invention also relates to a part comprising a detection device according to the invention such that an impact on the part is detected by a visual inspection.

BRIEF DESCRIPTION OF THE SEVERAL VIEWS OF THE DRAWINGS

The effects and benefits of these characteristics will be better understood in the light of the detailed description of examples of embodiments of detection devices according to the invention, made with reference to figures which show in a non-limiting way.

DETAILED DESCRIPTION OF THE INVENTION

Figure 1:
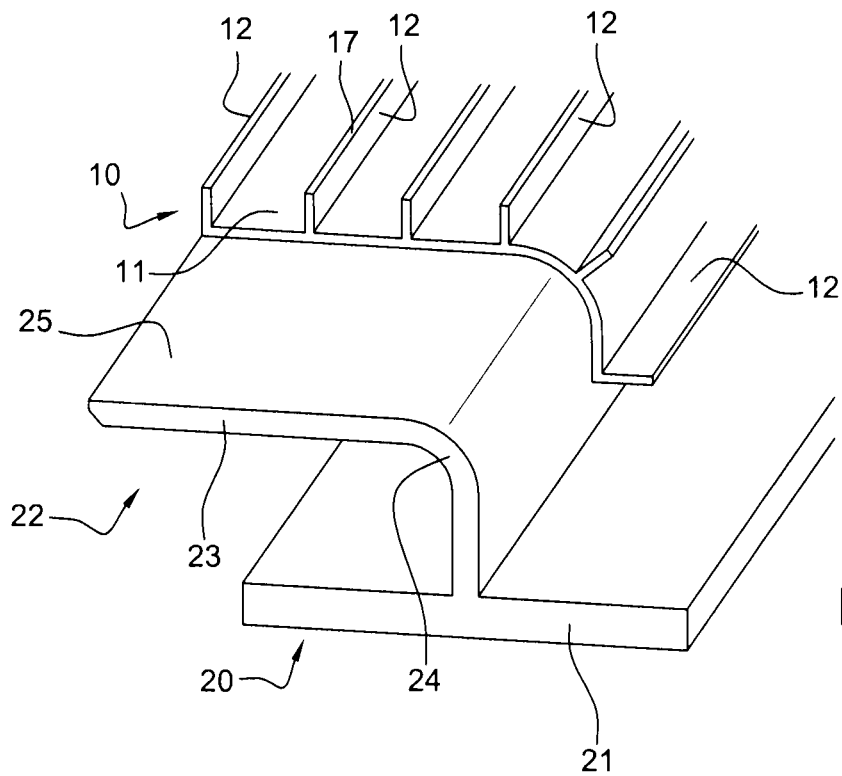
FIG. 1: an overview in perspective of a first example of the device for detecting shocks according to the invention in position on a sensitive portion of a part.

FIG. 1 shows a first example of a device according to the invention. This figure shows a structural part 20; this part comprises a so-called sensitive portion 22. This sensitive portion, here for purposes of illustration a stiffener of a panel skin 21, comprises a web 23 and an bended area 24 between the web 23 and the panel skin 21.

The sensitive portion 22 of the part 20 is covered at the so-called sensitive surfaces 25, considered as being able to be subjected to shocks, in this case an exposed face of the stiffener, web and bended area not protected by the panel skin, by a detection device 10.

The detection device 10 is mounted on the sensitive surfaces 25 on which it is fixed, advantageously by gluing.

The detection device 10 does not contribute significant structural resistance to the part 20 and forms a sacrificial part whose damage does not in itself have any effect on the resistance of the structure on which the part is incorporated.

The detection device 10 is therefore an inert structure, inert in the sense that it does not act in an active way as, for example, a sensor transmitting data would do, intended to be subjected to the shock of an object impacting the part 20 on the sensitive surface 25 covered by the detection device.

The detection device 10 comprises firstly a base 11, fixed to the part 20 by a lower face 111 of said base, and secondly at least one detector 12, a priori a set of detectors.

A detector 12 consists mainly of an element of the structure of the detection device 10, protruding with respect to an upper face 112 of the base 11, opposite to the lower face 111, the mechanical resistance of which is such that, when said detector is subjected to a shock and the energy of the shock reaches or exceeds a threshold energy Es selected through the design of the detection device, it is mechanically deformed permanently, at least partially, so that the persistent deformation resulting from the shock retains a memory of the shock and is of a sufficient magnitude that it can be observed during a visual inspection even though the event is past and the cause of the shock is no longer present.

In practice, to cover a more or less extended area and detect shocks generated by small-sized objects, the detection device 10 comprises several detectors 12, as in the example in FIG. 1, arranged in a more or less regular way on the upper face 112 in the form of elongated webs.

The detectors 12 can be fixed mounted on the base 11 but preferably the detectors and the base are produced at the same time, for example by molding or extruding the material from which they are made.

A shock occurring on a detector 12 may result in all or part of the detector being broken, when the material from which the detector has been made is a fragile material, or may result in the detector deforming locally, when the material from which the detector has been made is a ductile material.

In a preferred form, when it is wished to avoid having portions of the detection device 10 becoming detached if there is a shock, for example because of a risk that detached portions of the detection device work their way into areas where they will be difficult to remove, the detection device is produced using a ductile material.

Such a material can be, for example, a metal, such as aluminum or an aluminum alloy, or a polymer, such as a polycarbonate.

Another advantage of using a ductile material, at least for the base 11, is that the detection device 10 can be produced in a standardized form, in plates or ribbons for example, which can be formed into the shape of the sensitive portion 22 that must be fitted with the detection device at the time when said detection device is fixed onto the part.

Otherwise, when the base is made from a material that is fragile or not very ductile, the detection device 10 must be produced in the usage shape wanted, or in a shape compatible with the wanted shape, to be able to be fixed without said detection device breaking when it is fixed on the part.

In practice the choice of the material from which the detection device 10 is to be made will take into consideration the constraints that will be imposed by the designer of the part.

The mass of the detection device 10 is, for example, an important criterion if said detection device must remain in place when the part 20 is in service, while it is ancillary if said detection device is installed temporarily during assembly operations for the part and then removed before it becomes operational.

The costs, corrosion risks, conductivity, inflammability, sensitivity to chemical agents and, in a general way, all aspects that might interact with the environment in which the part 20 might be located during the period when it is equipped with the detection device 10 are elements that allow the person skilled in the art to choose the material from which the detection device 10 is made, and also the way in which it is fixed on the sensitive portion 22 of the part 20.

Advantageously, the detection device 10 is fixed by gluing, for example by a glue deposit or by an adhesive film, but it can also be fixed by means of fasteners distributed such as clips or rivets that, not being subjected to significant constraints, can where necessary be made from an organic plastic material.

The shape and number of the detectors 12, more specifically an areal or linear density of the detectors, and their structural characteristics are mainly a function firstly of the types of shocks whose occurrence one wishes to detect, and secondly the characteristics of the part's sensitive portion 22 itself.

Figure 2:
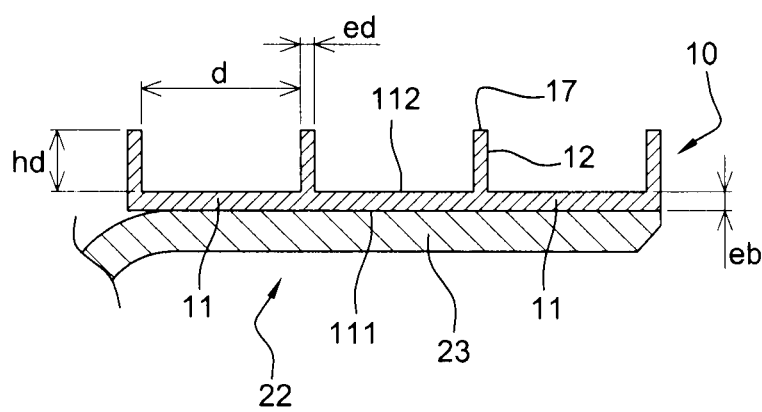
FIG. 2: a cross-section of a device for detecting shocks similar to the device of FIG. 1 in position on a part.

With reference to FIG. 2, which shows a cross-section of a detection device 10, of the same type as the one shown in FIG. 1, fixed on a sensitive portion 22 of a part, the detectors 12 are in the form of substantially parallel webs spaced at a distance d from each other; each detector has a height hd and thickness ed, that are small relative to the length of the web considered parallel to the surface of the base 11, i.e. the length of the web is at least an order of magnitude greater than the height hd and thickness ed.

For reasons of simplification, it is assumed here that the desired detection conditions are uniform and that the parameters d, hd and ed are constant in the detection device considered.

However, detection devices whose characteristics change are advantageously utilized where different requirements with regard to the shocks that is to be detected have to be taken into account according to the locations of the part concerned.

In the general case, for detecting the impact of an object, i.e. to be sure that at least one detector 12 will be impacted, the distance d between the detectors will be chosen to be less than the small dimension D of the objects likely to create the shock. In practice the condition 2 times d substantially equal to D is sufficient to ensure the detection of shocks with regard to the criterion of the dimensions of the impacting object.

In addition, for a given energy to produce a visually detectable effect on the detectors 12, the resistance of the detectors, in particular their resistance to buckling and/or bending, needs to be low enough that a detector undergoes a minimum desired deformation under the effect of an impact with an energy that is to be detected, i.e. when the energy is equal to or greater than a selected threshold energy Es.

It is also understood that for a low energy, i.e. less than the threshold energy Es below which the structure is considered not to be damaged, it is desirable that the detectors 12 do not undergo any significant deformation in order to avoid carrying out an unnecessary detailed inspection, or at least that the observation of the deformation, in particular its magnitude, allows the energy of the shock to be estimated.

In the case of detectors 12 made from a ductile material, the impacted detector is only deformed, without being broken, and the detector's mechanical characteristics, dependent on the material used and its geometric dimensions, are chosen so that the magnitude of the detector's deformation is equal to or greater than a selected threshold magnitude As when the detector is subjected to a shock with an energy equal to or greater than the threshold energy Es.

Thus, when it is observed than a detector has a deformation equal to or greater than the threshold magnitude As, there is a high probability that the shock causing the detector's deformation has an energy equal to or greater than the threshold energy Es. A detailed inspection of the part can then be carried out to check the effects of the shock on the part.

Conversely, if the magnitude of an observed deformation is less than the threshold magnitude As, the energy of the shock causing the deformation is less than the threshold energy Es.

In the case of detectors 12 made from a fragile material, the impacted detector is such that the deformation caused by a shock with an energy equal to or greater than the threshold energy Es has the effect of breaking the detector. This result is obtained in the design of the detectors by producing them so that the threshold magnitude As of the detector's deformation, obtained when the energy of the shock is greater than or equal to the threshold energy Es, corresponds to the breaking of the detector.

Thus, when it is observed that a detector has been broken, i.e. that it has been deformed beyond the threshold magnitude As, there is a high probability that the shock causing the detector to break has an energy equal to or greater than the threshold energy Es. A detailed inspection of the part can then be carried out to check the effects of the shock on the part.

Conversely, if no broken detector is observed, it will be deduced from this that no shock with an energy greater than the threshold energy Es has occurred.

Determining a detector's resistance to buckling and/or bending, its deformations or breakage under the effect of a shock, is a function of its dimensions, in particular the detector's thickness ed and height hd, and the material the detector is made from.

The relationship between these elements is a matter of standard calculations in the field of the resistance of materials.

As an example, a detection device made from a ductile material with detectors of thickness ed=0.5 mm and height hd=3 mm, associated to a distance between detectors d=8.9 mm, manufactured in polycarbonate making it possible to detect shocks of 10 joules or more with an impacting object with a characteristic dimension of 16 mm (in practice for the tests the diameter of a metal sphere).

Figure 3:
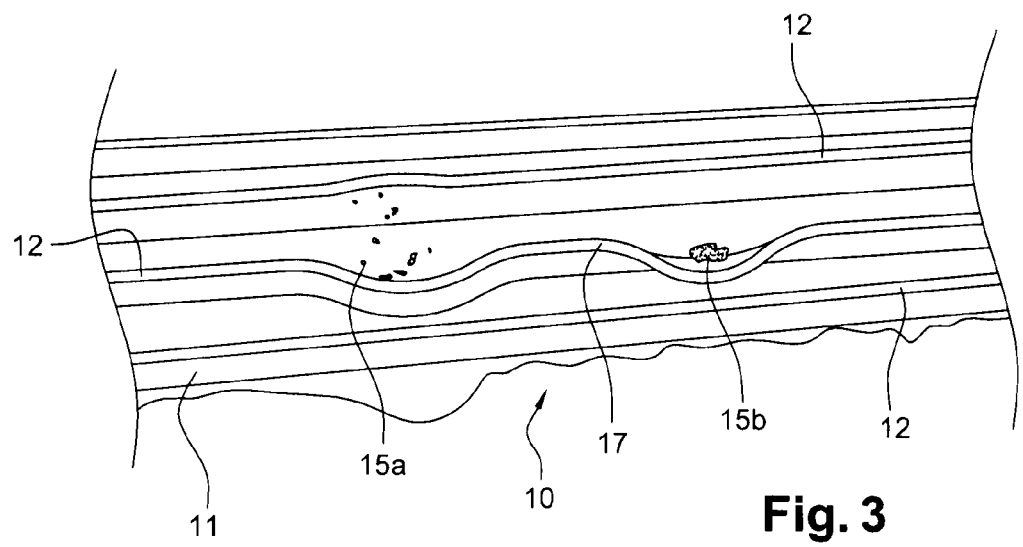
FIG. 3: a photograph of a device for detecting shocks similar to the one shown in FIG. 2 and having been subjected, on an experimental basis, to two shocks.

The photograph in FIG. 3 gives an illustration of the test results obtained in this configuration for shocks of 10 joules.

The impacting object produced, in two successive tests, permanent deformations 15a and 15b of one of the detectors 12 of the detection device, perfectly visible, whereas said impacting object is no longer present.

The magnitude of the deformations can be measured, directly on the detection device or for example on a photograph.

Advantageously the choice of a threshold value As for the magnitude of deformations of between 1 mm and 5 mm allows a trained operator to determine, with a low margin of uncertainty, whether the magnitude of the deformation is equal to or greater than the value of the selected threshold magnitude As.

A different value of the threshold magnitude As can, however, be chosen because of special conditions, for example the dimensions of the detection device or particular difficulties for carrying out a visual inspection of the area in question.

It is quite clear that the visual inspection can be carried out if required by using observation means that would be justified, for example for conditions of access to the area to be inspected, without departing from the scope of this invention. Such observation means consist, for example, of deflecting mirrors or periscopes, glasses for remote viewing, endoscopes, etc. for real-time observations or, where appropriate, of picture shooting devices, cameras, etc. for observations in deferred processing and for possible archiving.

It is noted on the photograph in FIG. 3 that the deformations of the detectors, which can be observed without special means, have been the subject of a contrasting coloration of an upper free edge 17 of the detectors, which increases the contrast and improves the observation conditions.

This principle is advantageously generalized on the detectors of the invention and the observation of deformations is facilitated by using contrast means, for example by coloring lateral faces and the upper portion of webs, and optionally the upper face 112 of the base, in different shades such that, depending on the colors or contrasts observed according to the angles of observation, the deformations of the detectors stand out visually with an increased contrast.

In the situation presented in FIG. 3, the structure of the part 20 on which the detection device is glued has not undergone any apparent damage but the detection device 10 makes it possible to observe that a shock has occurred with an impact energy greater than the set threshold Es.

An advantage of the detection device is the fact that the shock with its characteristics is thus memorized and that it can be observed until the detection device has been removed or replaced.

The part will therefore in this field be the subject of a local inspection by known non-destructive inspection means (ultrasound, radiography, etc.) in order to check whether the identified impact has actually damaged the part or not and to decide the measures to be taken, repairing or replacing the part.

Another advantage of the device is therefore also the fact that the thorough inspection of the impacted area will only be triggered when there is a significant probability that the impact had an energy likely to damage the part, and an impact with a lower energy will not be considered.

It should be noted that the detection device also plays a role, to a certain extent in covering the sensitive portion of the part, in protecting the part 20 that can be reinforced if necessary by producing, depending on the level of protection sought, a detection device 10 with a base 11 with a greater or lesser thickness eb and fixed to the structure by means also more or less protective of the part, for example a thick shock-absorbing adhesive film. Advantageously, when this function of the detection device 10 is sought the base 11 will be calculated so that the part will be protected from shocks with an energy less than the selected threshold energy Es.

The form of the detection device described in detail is only an example of realization and the detection device 10 can have different forms in which the detectors 12 comprise structural elements protruding with respect to the upper face 112 of a base 11; these structural elements undergo a permanent deformation, plastic or by breaking, when they undergo a shock with an energy equal to or greater than a selected threshold Es.

Figure 4:
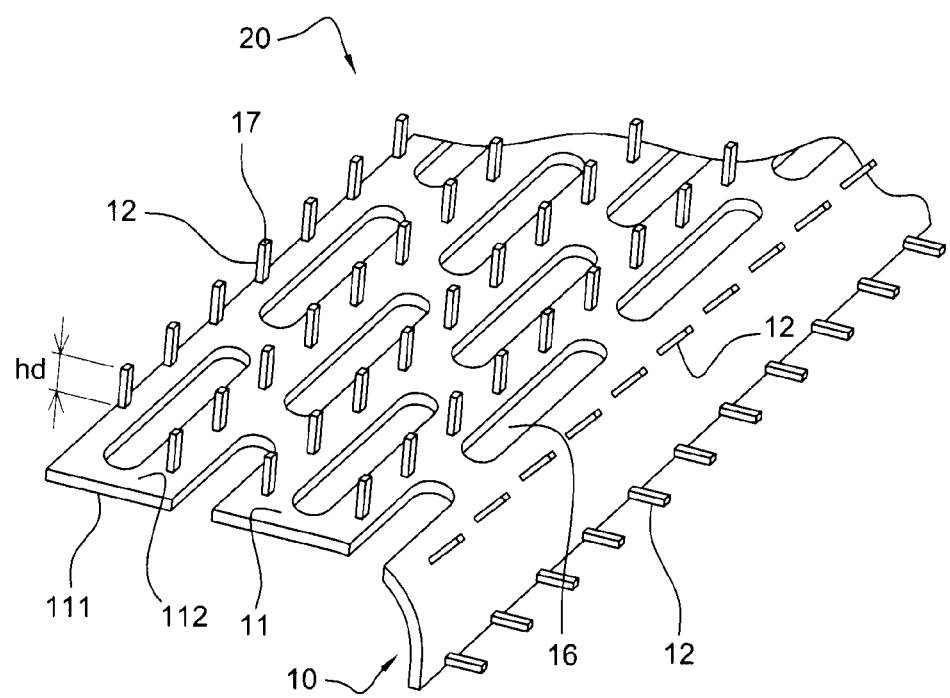
FIG. 4: a perspective view of an embodiment of a device for detecting shocks according to the invention with a reduced mass.

FIG. 4 illustrates an example of a detection device 10 in which the detectors 12 have the form of protruding pins with cylindrical cross-sections, in a plane parallel to the base 11, substantially slightly rectangular or square, and in which in addition the base 11 is partially hollowed out by through or blind recesses 16.

The effect of these two characteristics, brought together in this embodiment of a detection device but in practice independent, is to reduce the mass of the detection device 10 compared to the embodiment illustrated in FIG. 1.

In this case the pins, with a height hd, are arranged in rows separated by distance d and in the same row they are separated by a distance that can be different but in practice is substantially equivalent so as to respect in all directions at the surface of the detection device the conditions necessary for detecting impacting objects with a given minimum dimension.

Other shapes are, of course, possible for detectors in the form of pins, such as circular or other cross-sections or conical shapes for example.

In this form of embodiment of detectors as pins, the visual contrast of detectors' deformations can also be increased by colorations of the surfaces of portions of the detection device facilitating the visual inspection. For example, the upper free edge 17 of a pin, i.e. the top of the pin, and optionally the lateral faces of the pin, can have a contrasting color relative to the upper face 112 of the base. Thus a deformation of the pin that is expressed by a visible displacement of its upper free edge 17 in relation to the base 11 is simpler to observe.

When the detector must break as a result of a shock, the detection device will preferably be colored so as to make the color of the material from which the pin is made, and which will be visible when the pin is broken, stand out by contrast.

In a preferred form of embodiment, the detection device 10 is produced in the form of plates or tapes in standard dimensions that can be cut if necessary, and comprising, on the lower face 111 of the base 11 designed to be fixed on the surface 25 of the sensitive portion of the part 20, an adhesive adhering by contact. In addition the thickness eb and the material of the base 11 are preferably chosen so that, when applied, the detection device 10 can conform to the geometry of the part on which it is fixed.

The detection device 10 of the invention thus makes it possible to detect simply by visual observation that an impact has occurred on a part and that the energy of this shock has exceeded a threshold set so that it could damage the part without this damage being visible by just a visual inspection of the part.

The detection device is light, can be adapted to numerous shapes of parts, is easy to fix and, if necessary, to remove. Finally, produced in large quantities from inexpensive materials, its cost is minimal.

The invention claimed is:
1. A detection device for shocks on a part, said detection device being an inert structure comprising:
   a base, intended to be fixed by a lower face of the base onto a surface of the part where occurrence of a shock is to be detected; and at least one detector fixed at the base on a side of an upper face of the base, said detector including an element of the structure of the detection device, protruding with respect to said upper face, wherein mechanical resistance of said detector, defined by geometric dimensions of said detector and the material said detector is made from, being determined so that said detector undergoes a persistent deformation of a magnitude equal to or greater than a selected threshold magnitude when said detector is subjected to the shock of an object with an energy equal to or greater than a selected threshold energy.

2. The detection device according to claim 1, wherein said detector is made from a ductile material able to be fully or partially plastically deformed under the effect of a shock with an energy greater than a predefined value.

3. The detection device according to claim 2, wherein the threshold magnitude is between 1 mm and 5 mm.

4. The detection device according to claim 1, wherein said detector is made from a fragile material, said detector being able to be fully or partially deformed to breaking under the effect of a shock with an energy greater than a predefined value.

5. The detection device according to claim 1, wherein said detector has a form of a web substantially perpendicular to the upper face of the base with a height and a thickness that are small relative to a length parallel to said upper face.

6. The detection device according to claim 1, wherein said detector has a pin shape with a height.

7. The detection device according to claim 1, wherein the base comprises recesses apart from fixing areas of said detector.

8. The detection device according to claim 1, wherein said detector is made from a metallic material.

9. The detection device according to claim 1, wherein said detector is made from a polymer material.

10. The detection device according to claim 1, wherein the lower face of the base comprises an attachment adhesive.

11. The detection device according to claim 1, wherein the at least one detector includes a plurality of detectors, the plurality of detectors being distributed over the base, and wherein distances between the plurality of detectors are chosen according to a minimum characteristic dimension of an impacting object that is to be detected.

12. The detection device according to claim 1, wherein the base is made from a ductile material able to be deformed so as to take on a shape of a so-called sensitive surface of a part on which the base is intended to be fixed.

13. The detection device according to claim 1, wherein the at least one detector includes a plurality of detectors, and wherein faces of the plurality of detectors and/or the upper face of the base are tinted to increase a visual contrast between the plurality of detectors and the base or between different faces of a detector of the plurality of detectors.

14. The detection device according to claim 1, wherein the base is made from a material and with a thickness determined so that the detection device provides mechanical protection for the part on which the base is intended to be fixed with regard to shocks with an energy less than the threshold energy.

15. A part comprising, over all of or part of a surface of said part, the detection device of any one of claims 1 to 14.

* * * * *